US010800134B2

(12) United States Patent
Sharon et al.

(10) Patent No.: US 10,800,134 B2
(45) Date of Patent: Oct. 13, 2020

(54) STRUCTURAL PANEL WITH WOVEN ELEMENT CORE

(71) Applicant: United Technologies Corporation, Farmington, CT (US)

(72) Inventors: John A. Sharon, Manchester, CT (US); Kenji Homma, Glastonbury, CT (US); Justin R. Hawkes, Marlborough, CT (US); Paul R. Braunwart, Hebron, CT (US); Ellen Y. Sun, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 351 days.

(21) Appl. No.: 15/182,131

(22) Filed: Jun. 14, 2016

(65) Prior Publication Data

US 2017/0355169 A1     Dec. 14, 2017

(51) Int. Cl.
*B32B 3/28*     (2006.01)
*B32B 15/04*    (2006.01)
(Continued)

(52) U.S. Cl.
CPC ............... *B32B 3/28* (2013.01); *B32B 3/266* (2013.01); *B32B 5/024* (2013.01); *B32B 5/028* (2013.01); *B32B 15/02* (2013.01); *B32B 15/043* (2013.01); *B32B 15/14* (2013.01); *B32B 15/18* (2013.01); *B32B 15/20* (2013.01); *B32B 27/12* (2013.01); *B64C 1/40* (2013.01); *B32B 2250/03* (2013.01); *B32B 2250/40* (2013.01); *B32B 2262/02* (2013.01); *B32B 2262/0269* (2013.01); *B32B 2262/101* (2013.01); *B32B 2262/103* (2013.01);
(Continued)

(58) Field of Classification Search
CPC ......... B32B 3/28; B32B 15/043; B32B 15/20; B32B 3/266; B32B 15/14; B32B 27/12; B32B 15/02; B32B 5/024; B32B 15/18; B32B 5/028; B32B 2607/00; B32B 2605/08; B32B 2307/10; B32B 2262/106; B32B 2262/105; B32B 2262/103; B32B 2262/101; B32B 2307/102; B32B 2262/0269; B32B 2262/02; B32B 2250/03; B32B 2307/56; B32B 2605/18; B32B 2250/40; B32B 2605/12; B64C 1/40; B64D 2033/0206
See application file for complete search history.

(56) References Cited

U.S. PATENT DOCUMENTS

| | | | |
|---|---|---|---|
| 3,578,526 A | 5/1971 | Harding et al. | |
| 4,020,542 A | 5/1977 | Slaughter | |
| 4,136,231 A | 1/1979 | Slaughter | |
| 4,333,216 A | 6/1982 | Slaughter | |
| 4,539,244 A | 9/1985 | Beggs et al. | |

(Continued)

FOREIGN PATENT DOCUMENTS

| | | |
|---|---|---|
| GB | 1589715 A | 5/1981 |
| IL | 51715 A | 4/1982 |

OTHER PUBLICATIONS

EP search report for EP17175775.0 dated Sep. 18, 2017.

*Primary Examiner* — Brian Handville
(74) *Attorney, Agent, or Firm* — Getz Balich LLC

(57) ABSTRACT

A structural panel includes a first skin, a second skin and a core. The core is connected to the first skin and the second skin. The core includes a corrugated sheet of wire mesh that includes a plurality of corrugations. Each of the corrugations extends vertically between and engages the first skin and the second skin.

20 Claims, 14 Drawing Sheets

(51) Int. Cl.
  *B32B 5/02* (2006.01)
  *B32B 15/02* (2006.01)
  *B32B 15/14* (2006.01)
  *B32B 15/18* (2006.01)
  *B32B 15/20* (2006.01)
  *B32B 27/12* (2006.01)
  *B32B 3/26* (2006.01)
  *B64C 1/40* (2006.01)
  *B64D 33/02* (2006.01)

(52) U.S. Cl.
  CPC ... *B32B 2262/105* (2013.01); *B32B 2262/106* (2013.01); *B32B 2307/10* (2013.01); *B32B 2307/102* (2013.01); *B32B 2307/56* (2013.01); *B32B 2605/08* (2013.01); *B32B 2605/12* (2013.01); *B32B 2605/18* (2013.01); *B32B 2607/00* (2013.01); *B64D 2033/0206* (2013.01)

(56) References Cited

U.S. PATENT DOCUMENTS

| | | |
|---|---|---|
| 4,671,841 A | 6/1987 | Stephens |
| 5,034,256 A | 7/1991 | Santiso, III et al. |
| 5,455,096 A | 10/1995 | Toni et al. |
| 5,674,586 A | 10/1997 | Toni et al. |
| 7,588,212 B2 | 9/2009 | Moe et al. |
| 7,866,440 B2 | 1/2011 | Douglas |
| 7,923,668 B2 | 4/2011 | Layland et al. |
| 7,954,224 B2 | 6/2011 | Douglas |
| 8,028,797 B2 | 10/2011 | Douglas |
| 9,296,044 B2 | 3/2016 | Douglas |
| 2005/0014429 A1* | 1/2005 | Tueshaus ............. B29C 70/688 442/6 |
| 2014/0215997 A1* | 8/2014 | Lior ........................ F16L 57/00 60/39.01 |
| 2016/0017775 A1 | 1/2016 | Mattia |

* cited by examiner

STRUCTURAL PANEL WITH WOVEN ELEMENT CORE

BACKGROUND OF THE INVENTION

1. Technical Field

This disclosure relates generally to a structural panel and, more particularly, to a structural panel with a structural core for use, for example, in an aircraft system.

2. Background Information

Various types of structural panels are known in the art. These structural panels typically include a light-weight core between a pair of skins/face sheets. Examples of such a light-weight core include a honeycomb core made of metal or polymer materials, and a foam core. Such light-weight cores may be operable to damp panel vibrations by dissipating the vibrational energy. These light-weight cores may also be operable to attenuate/muffle acoustic noise where one of the skins is perforated, which perforations allow noise waves to enter the core for attenuation/muffling. Such structural panels are particularly useful in aircraft applications where there is a continuing need to dissipate vibrational energy which can adversely affect fatigue life and acoustic performance. While the light-weight cores described have various benefits, there is still room for improvement, and to further reduce structural panel weight and/or further reduce structural panel manufacturing costs.

SUMMARY OF THE DISCLOSURE

According to an aspect of the present disclosure, a structural panel is provided that includes a first skin, a second skin, and a core disposed between the first skin and the second skin. The first skin has a first side surface, a second side surface, and a thickness extending there between. The second skin has a first side surface, a second side surface, and a thickness extending there between. The core extends between the first side surface of the first skin and the first side surface of the second skin. The core includes a plurality of geometric structures formed of a wire mesh, which geometric structures extend between and are attached to the first skin and the second skin.

The structural panel may be configured for an aircraft system.

In a foregoing aspect of the above aspect, the plurality of geometric structures may include a plurality of corrugations. Each of the corrugations may be formed by a first side portion, a second side portion, and an intermediate portion that extends between the first side portion and the second side portion.

The corrugations may be linear and extend parallel to one another, or the corrugations may be non-linear. The structural panel has a length and the corrugations may extend substantially an entirety of the length.

In a foregoing aspect of the above aspect, the wire mesh may be configured from a plurality of wires woven together.

In a further embodiment of any of the foregoing aspects, the wire mesh may be formed of a plurality of metal wires, a plurality of polymeric wires, a plurality of ceramic wires, or some combination thereof.

In a further embodiment of any of the foregoing aspects, the wire mesh may be formed of a plurality of wires of a first gauge, and at least one second wire of a second gauge, which second gauge is different from the first gauge.

In a further embodiment of any of the foregoing aspects, the wire mesh may be formed of a plurality of wires of a first cross-sectional shape, and at least one second wire of a second cross-sectional shape, which second cross-sectional shape is different from the first cross-sectional shape.

In a further embodiment of any of the foregoing aspects, the first skin and the second skin are substantially non-perforated, or at least one of the first skin or second skin may be perforated.

In a further embodiment of any of the foregoing aspects, the plurality of geometric structures may include a plurality of locally enclosed structures.

In a further embodiment of any of the foregoing aspects, each of the locally enclosed structures may be formed by at least one side wall, and wherein the side wall and with at least one of the first skin or second skin defines an enclosed region.

In a further embodiment of any of the foregoing aspects, the locally enclosed structures all have the same shape.

In a further embodiment of any of the foregoing aspects, the locally enclosed structures may include at least one first type having a first geometric shape, and at least one second type having a second geometric shape, which first geometric shape is different from the second geometric shape.

According to another aspect of the present disclosure, a structural panel is provided that includes a first skin, a second skin, and a core. The first skin has a first side surface, a second side surface, and a thickness extending there between. The second skin has a first side surface, a second side surface, and a thickness extending there between. The core extends between the first side surface of the first skin and the first side surface of the second skin, wherein at least a first portion of the core is attached to the first skin and at least a second portion of the core is attached to the second skin. The core includes a plurality of wire elements, which wire elements are configured to permit relative movement there between in a manner that at least partially dissipates intermittent excitation forces applied to the structural panels.

In a further embodiment of the foregoing aspect, the plurality of wire elements include metal wires, polymeric wires, or ceramic wires, or some combination thereof.

The foregoing features and the operation of the invention will become more apparent in light of the following description and the accompanying drawings.

DETAILED DESCRIPTION OF THE INVENTION

Figure 1:
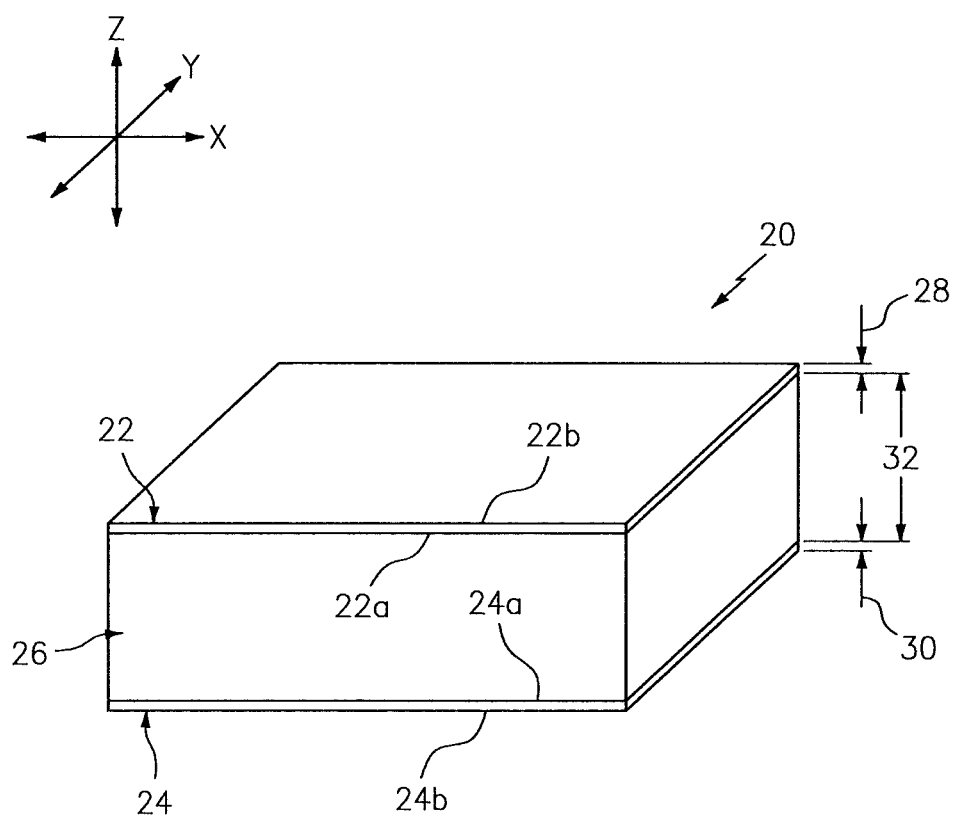
FIG. 1 is a schematic partial, perspective block diagram illustration of a low density/light-weight, structural panel.
Figure 19A:
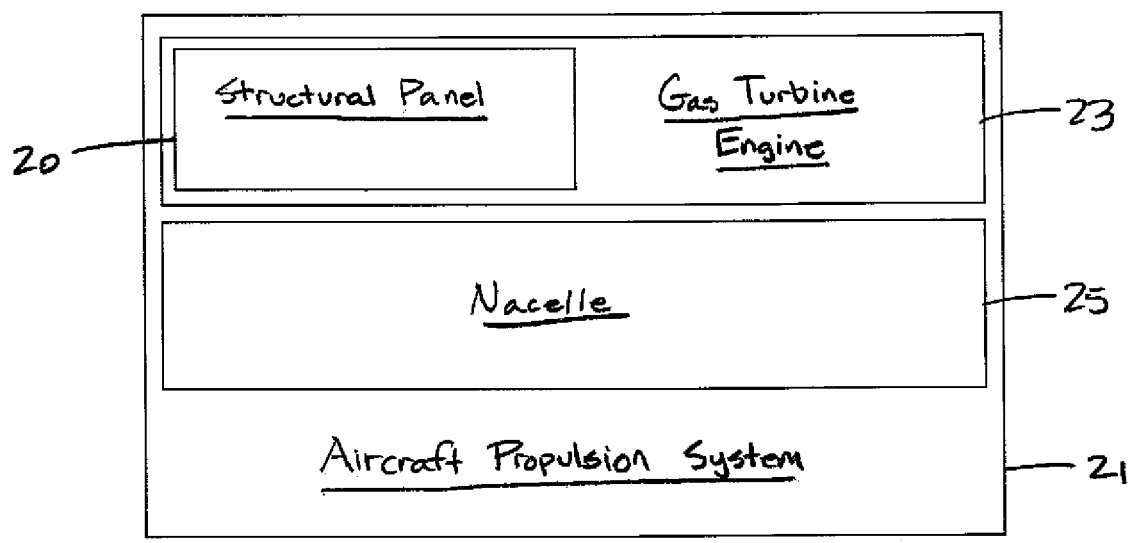
FIGS. 19A and 19B are block diagram illustrations of exemplary aircraft propulsion systems.
Figure 19B:
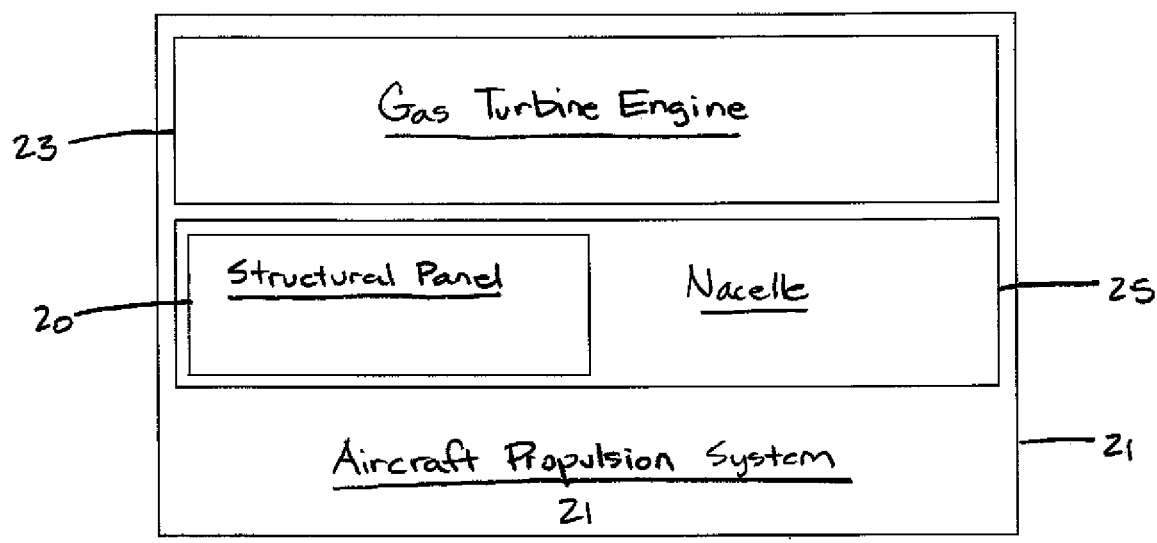

FIG. 1 is a partial, perspective block diagram illustration of a low density/light-weight, structural panel 20. This structural panel 20 may be configured as a panel of an aircraft propulsion system 21 (e.g. FIGS. 19A and 19B) such as, for example, a turbofan propulsion system or a turbojet propulsion system. With such a configuration, the structural panel 20 may be included in a gas turbine engine 23 (e.g. see FIG. 19A) or a nacelle 25 of the propulsion system 21 (e.g. see FIG. 19B). The structural panel 20, for example, may be configured as or with a gas path wall, an exhaust panel wall, an exhaust cone, an inner or outer barrel of the nacelle 25, a translating sleeve of a thrust reverser, etc. Alternatively, the structural panel 20 may be configured with another component/structure of the aircraft such as its fuselage or a wing. The structural panel 20 of the present disclosure, however, may alternatively be configured for non-aircraft applications. Exemplary non-aircraft applications may include, but are not limited to, locomotive, automotive, shipping and space/rockets applications.

To facilitate the description herein, the structural panel 20 may be described in terms of x, y, and z orthogonal axes; e.g., having a width that extends laterally along an x-axis, a length that extends longitudinally along a y-axis, and a height that extends height-wise along a z-axis. Of course the aforesaid orthogonal axes are relative to one another, are used here to facilitate the description, and are not intended to limit the present structural panel to any particular configuration. In some embodiments of the present disclosure, the structural panel 20 may be planar (e.g., extending within an x-y plane), but the structural panel 20 is not limited to a planar configuration. For example, the structural panel 20 may be curvilinear (e.g., curved, radially oriented, etc.), or may include differently configured portions; e.g., some planar, some curvilinear, etc.

The structural panel 20 includes a substantially solid first skin 22, a substantially solid second skin 24, and a structural core 26. The first skin 22 includes a first side surface 22a, a second side surface 22b, and a thickness 28 extending between the first and second side surfaces 22a, 22b. The second skin 24 includes a first side surface 24a, a second side surface 24b, and a thickness 30 extending between the first and second side surfaces 24a, 24b. The thickness 28 of the first skin 22 may be the same as or different from the thickness 30 of the second skin 24. Briefly, the structural core 26 is disposed and extends between the first skin 22 and the second skin 24. Portions of the structural core 26 are connected to the first side surface 22a of the first skin 22 and portions of the structural core are attached to first side surface 24a of the second skin 24. Portions of the structural core 26, for example, may be welded, soldered, brazed, fused, diffusion bonded, adhesively adhered or otherwise bonded, or mechanically fastened to the respective surface of the first skin 22 and/or the second skin 24. However, the present disclosure is not limited to any particular manufacturing methods.

The first skin 22 may be configured as a relatively thin sheet or layer of (e.g., continuous and uninterrupted) material that extends laterally and longitudinally (e.g., in an x-y plane). The first skin 22 is comprised of a material that may include, but is not limited to, a metal, a polymer, a fiber reinforced composite (e.g., fiberglass composite, carbon fiber composite, aramid fiber composite, etc.), or a combination thereof.

The second skin 24 may be configured as a relatively thin sheet or layer of (e.g., continuous and uninterrupted) material that extends laterally and longitudinally (e.g., in an x-y plane). In some embodiments, the first skin 22 and the second skin 24 may be parallel one another, but the present disclosure is not limited to a parallel skin configuration. The second skin 24 is comprised of a material that may include, but is not limited to, a metal, a polymer, a fiber reinforced composite (e.g., fiberglass composite, carbon fiber composite, aramid fiber composite, etc.), or a combination thereof.

The structural core 26 has a thickness 32, which thickness extends between the first side surface 22a of the first skin 22 and the first side surface 24a of the second skin 24. The thickness 32 of the structural core 26 may be substantially greater than the thickness 28 of the first skin 22 and/or the thickness 30 of the second skin 24. The thickness 32 of the core 26, for example, may be at least ten to forty times (10-40×), or more, greater than the thicknesses 28, 30 of the skins; however, the structural panel 20 of the present disclosure is not limited to such an exemplary embodiment.

Figure 2:
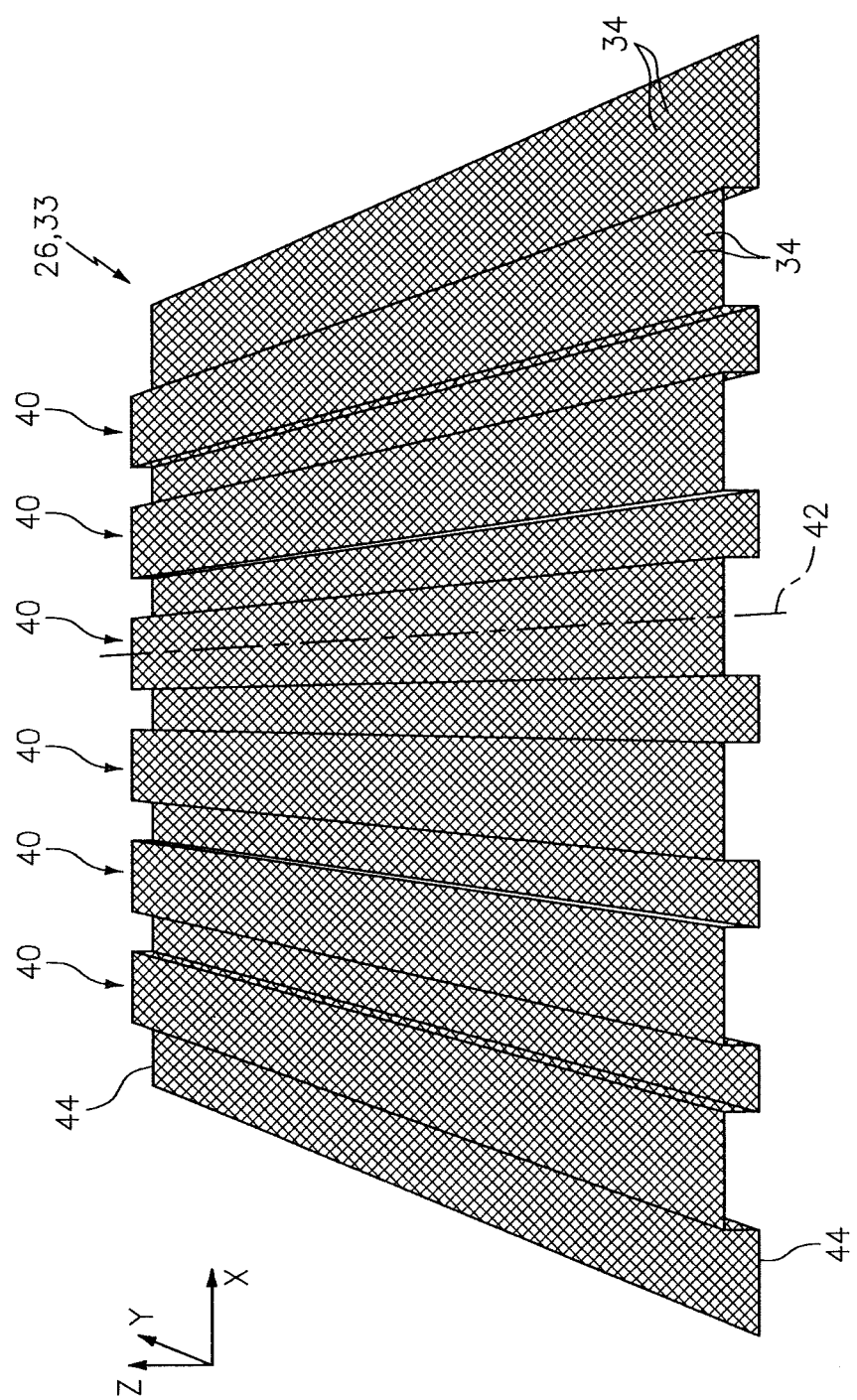
FIG. 2 is a perspective illustration of a structural core for the structural panel.

Referring to FIG. 2, the structural core 26 includes one or more geometric structures 33 formed from a plurality of elongated elements 34A and 34B (generally referred to as "34") together. For ease of description, these elongated elements 34 are described and referred to below as "wire". As will be discussed below, the term "wire" as used herein is not limited to any particular geometry or material.

Figure 3:
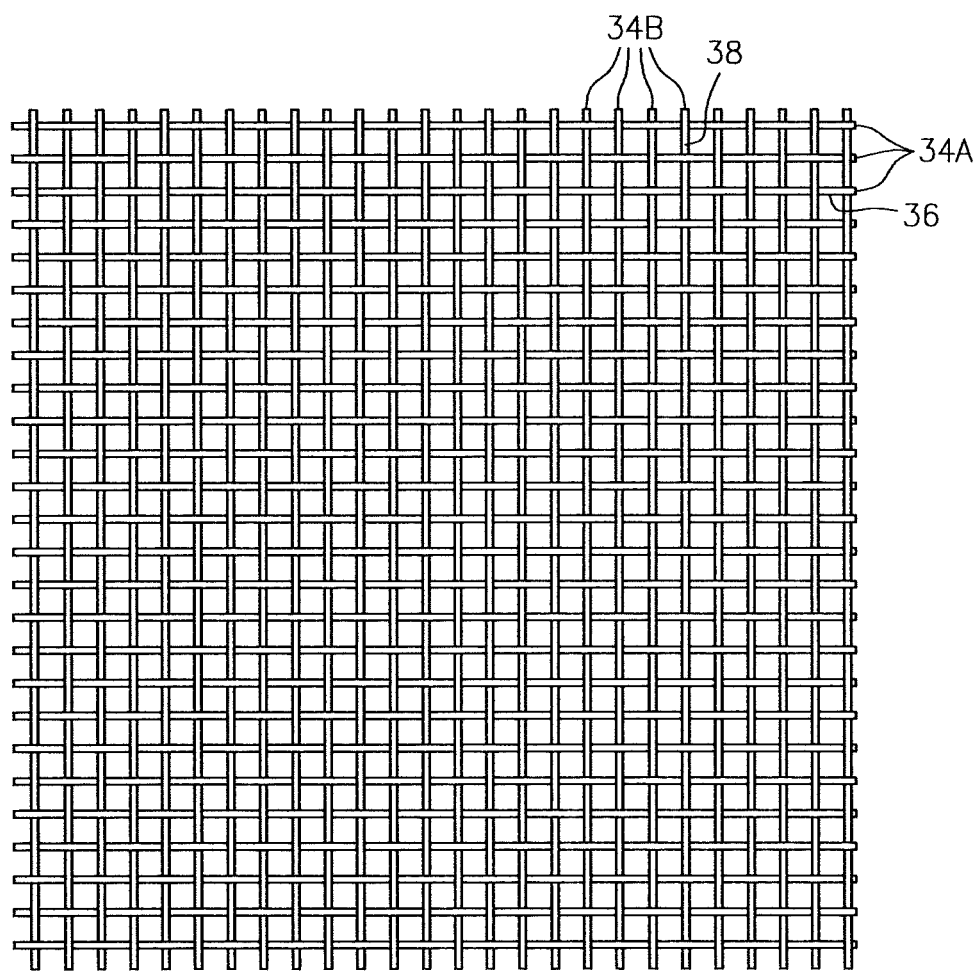
FIG. 3 is a schematic illustration of a sheet of wire mesh.

Referring to FIG. 3, in some embodiments the geometric structures 33 may be formed from a sheet of wire mesh; e.g., a two-dimensional (2D) weave of wires. For example, the wire mesh may include a plurality of first wires 34A extending along substantially parallel first wire trajectories 36 (e.g., centerline). The wire mesh also includes a plurality of second wires 34B extending along substantially parallel second wire trajectories 38 (e.g., centerline), which may be substantially perpendicular to the first wire trajectories 36. The first and the second wires 34B of FIG. 3 are woven together in a plain weave pattern; of course, the wires 34 may alternatively be woven in various other weave patterns. The sheet of wire mesh is then formed (e.g., bent, pressed, folded, etc.) into the structure 33 of FIG. 2; e.g., a corrugated structure. The present disclosure is not, however, limited to a woven wire mesh. For example, a plurality of wires may be collectively configured by processes other than weaving to form a structure, portions of which are attached to the first skin 22 and portions of which are attached to the second skin 24. As will be described below, a geometric structure formed of a plurality of wires and attached to the first and second skins 22, 24 provides structural integrity and spacing between the first and second skins 22, 24, and also allows for some amount of relative movement between wires within the geometric structure 33. The relative movement between wires can include frictional contact between wires, which frictional contact can dissipate excitation forces/energy.

Figure 4:
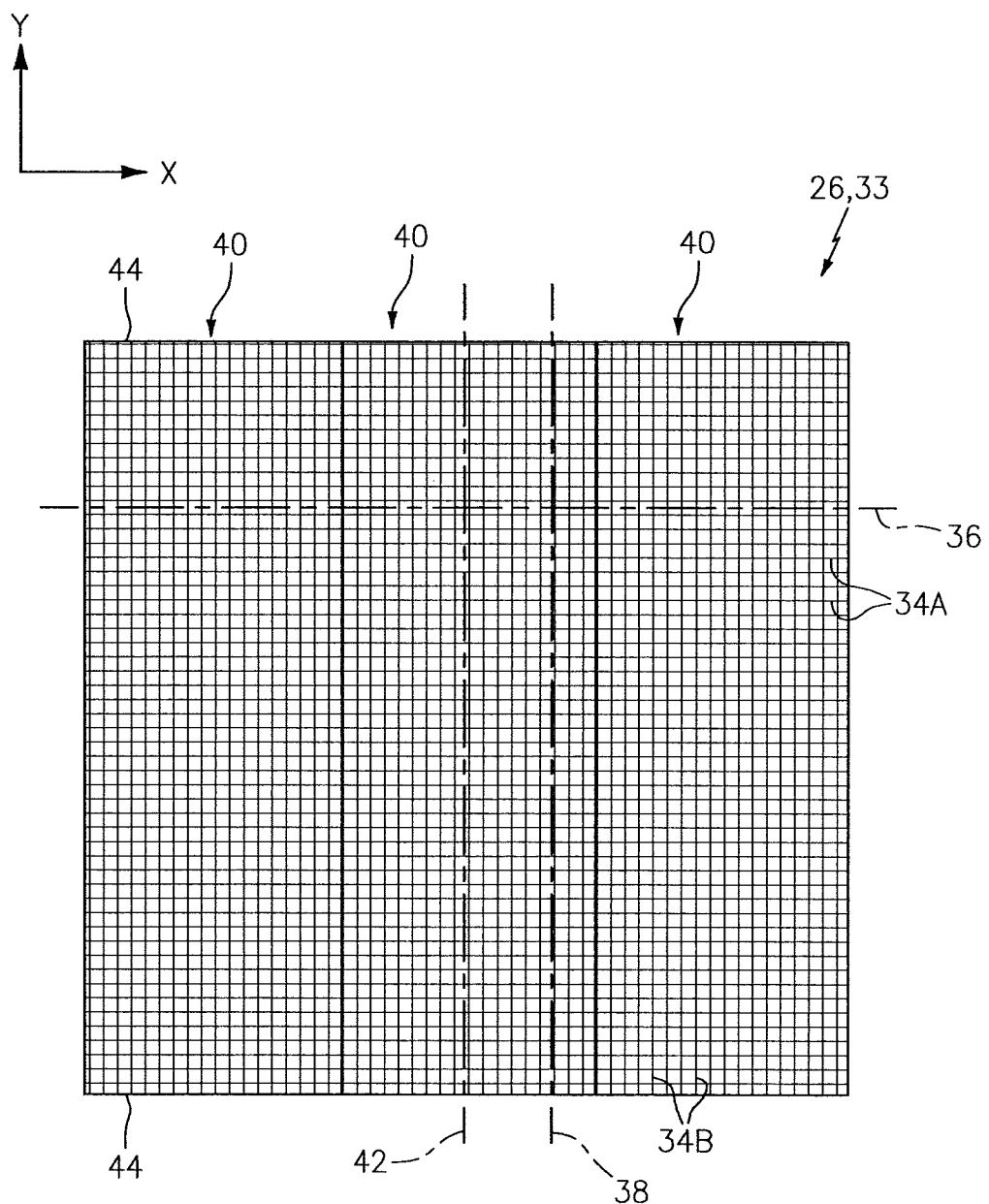
FIG. 4 is a schematic partial illustration of the structural core.

In some embodiments, the geometric structures 33 included within the structural core 26 may include a plurality of corrugations 40; e.g., see FIG. 2. These corrugations 40 are arranged in parallel with one another in at least one array. Each of the corrugations 40 extends longitudinally along a respective corrugation trajectory 42 (e.g., a longitudinal axis) between opposing corrugation ends 44. In some embodiments, this corrugation trajectory 42 is a substantially straight trajectory. Referring now to FIG. 4, in some embodiments this corrugation trajectory 42 is also substantially perpendicular to each first wire trajectory 36 and substantially parallel to each second wire trajectory 38. The corrugations 40 of present disclosure, however, are not limited to the foregoing exemplary corrugation trajectory 42 characteristics.

Figure 5:
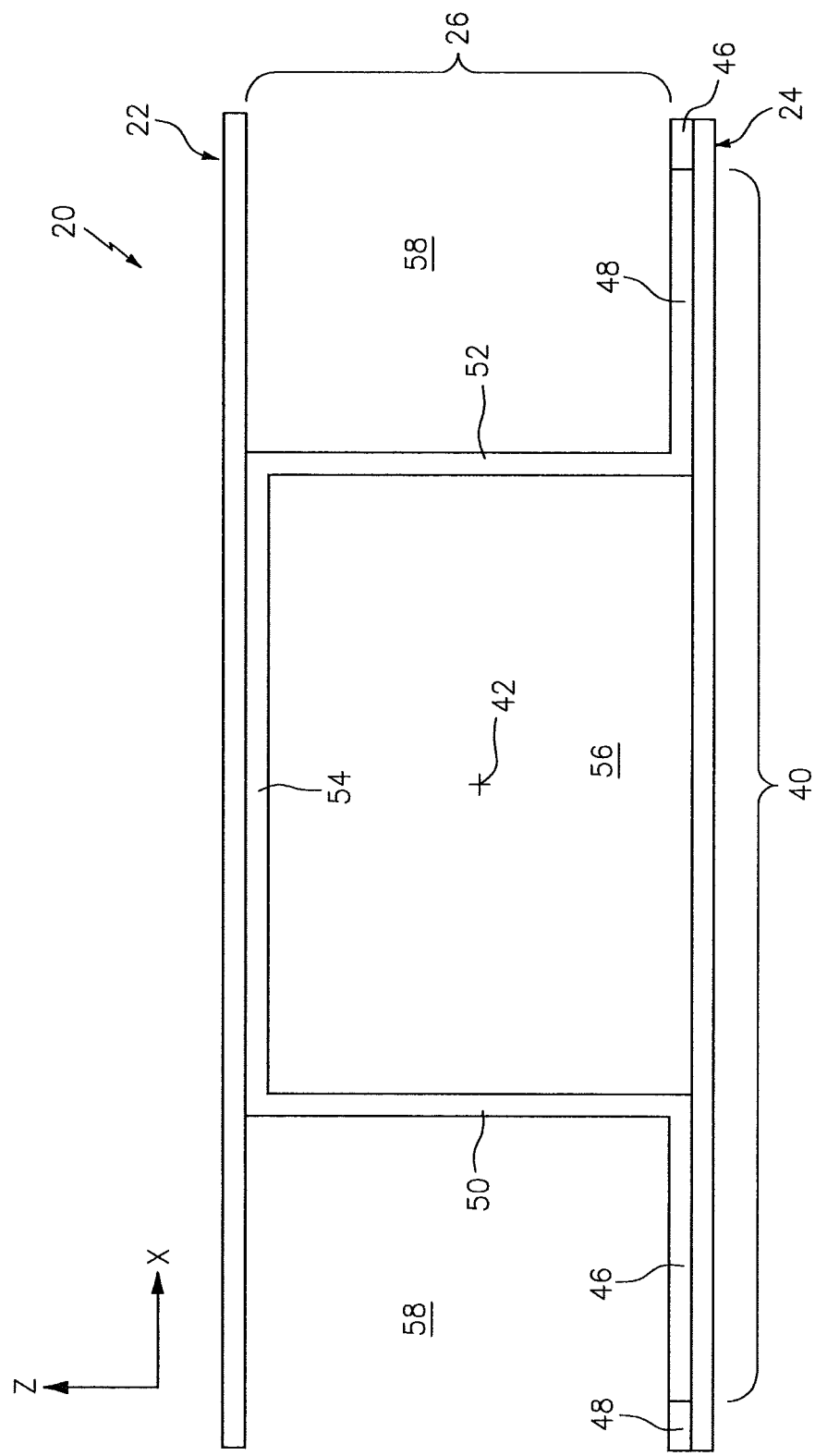
FIG. 5 is a schematic cross-sectional illustration of a portion of the structural panel.

Referring to FIG. 5, each of the corrugations 40 includes first and second end portions 46 and 48, first and second side portions 50 and 52 and an intermediate portion 54. The intermediate portion 54 extends generally laterally between and is connected to the first and the second side portions 50 and 52. The first side portion 50 (e.g., a left side portion) extends between and is connected to the first end portion 46 and the intermediate portion 54. The second side portion 52 (e.g., a right side portion) extends between and is connected to the second end portion 48 and the intermediate portion 54.

Figure 6:
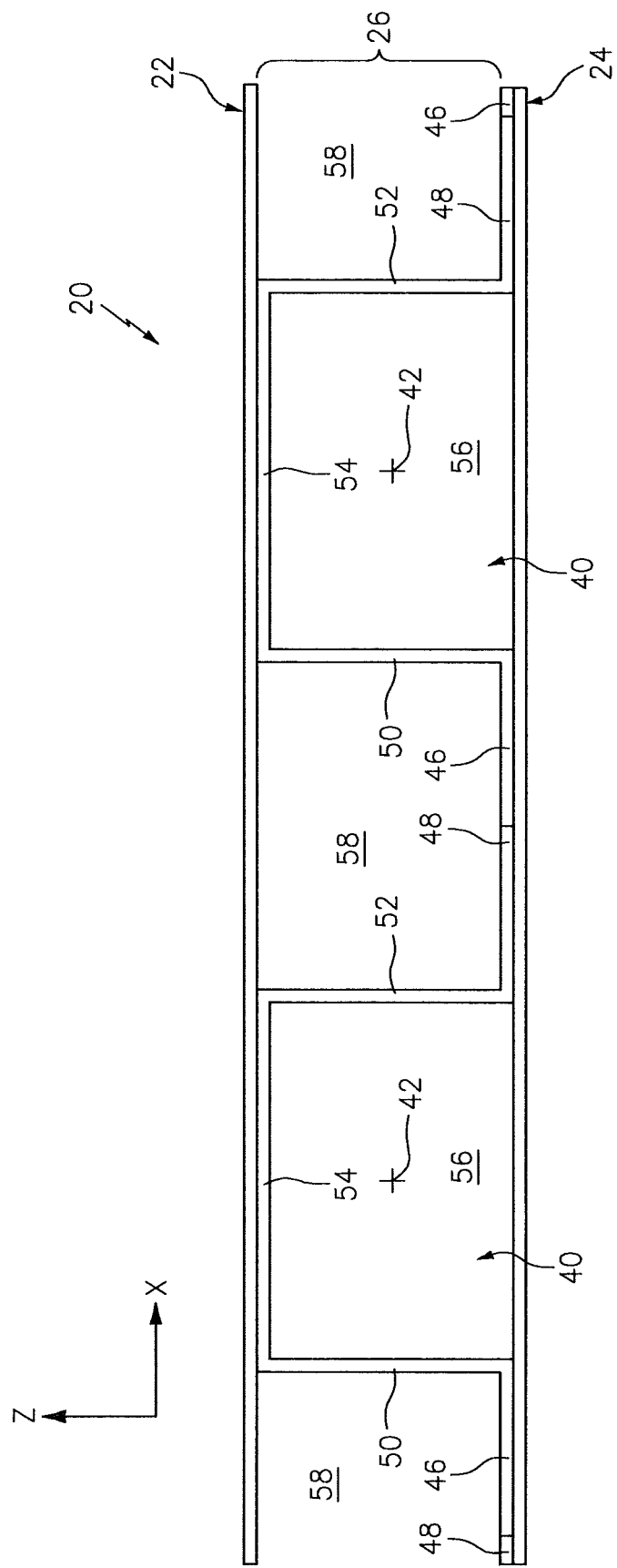
FIG. 6 is a schematic cross-sectional illustration of another portion of the structural panel.

Referring to FIG. 6, the intermediate portion 54 is connected to the first skin 22. The first and the second end portions 46 and 48 are connected to the second skin 24. With this configuration, each of the corrugations 40 forms a respective intra-corrugation channel 56 with the second skin 24. This intra-corrugation channel 56 extends laterally between the first and the second side portions 50 and 52. The intra-corrugation channel 56 extends height-wise between the intermediate portion 54 and the second skin 24. The intra-corrugation channel 56 extends longitudinally along the portions 50, 52 and 54 between the opposing corrugation ends 44; see FIG. 2. The intra-corrugation channel 56 of FIG. 6 has a rectangular cross-sectional geometry in the lateral-vertical (x-z) plane; however, the present disclosure is not limited to such an exemplary geometry.

Adjacent corrugations 40 also form a respective inter-corrugation channel 58 with the first skin 22. This inter-corrugation channel 58 extends laterally between the first side portion 50 of one of the corrugations 40 and the second side portion 52 of an adjacent one of the corrugations 40. The inter-corrugation channel 58 extends vertically between the end portions 46 and 48 of the adjacent corrugations 40 and the first skin 22. The inter-corrugation channel 58 extends longitudinally along the portions 46, 48, 50 and 52 between the opposing corrugation ends 44; see FIG. 2. The inter-corrugation channel 58 of FIG. 6 has a rectangular cross-sectional geometry in the lateral-height-wise (x-z) plane; however, the present disclosure is not limited to such an exemplary geometry. Furthermore, while the size and shape of the channels are depicted as substantially identical, the size and/or shape of the channels may alternatively be different from one another.

The structural panel 20 may be utilized in applications wherein the structural panel 20 is subjected to intermittent excitation forces; e.g., periodic mechanically or acoustically imposed forces that left undamped can cause the panel to vibrate. In such applications, the present structural panel 20 is configured to damp these excitation forces. As indicated above, in some embodiments the structural core 26 may include structures 33 formed of a plurality of wires that are collectively configured (e.g., by a weaving process, by a non-woven process, etc.). To the extent that excitation forces (periodic or otherwise) are applied to the panel 20, at least a portion of such forces may be transferred to the structural core 26. Within the structural core 26, the plurality of wires are configured to permit some amount of relative movement. The relative movement between wires can include frictional contact between wires, which frictional contact can dissipate the excitation forces; e.g., change vibrational energy into heat energy, thereby dissipating the vibrational energy. As a result, the core 26 may damp vibrations transferred between the first skin 22 and the second skin 24.

Figure 7:
FIG. 7 is a schematic partial illustration of another structural core.
Figure 8:
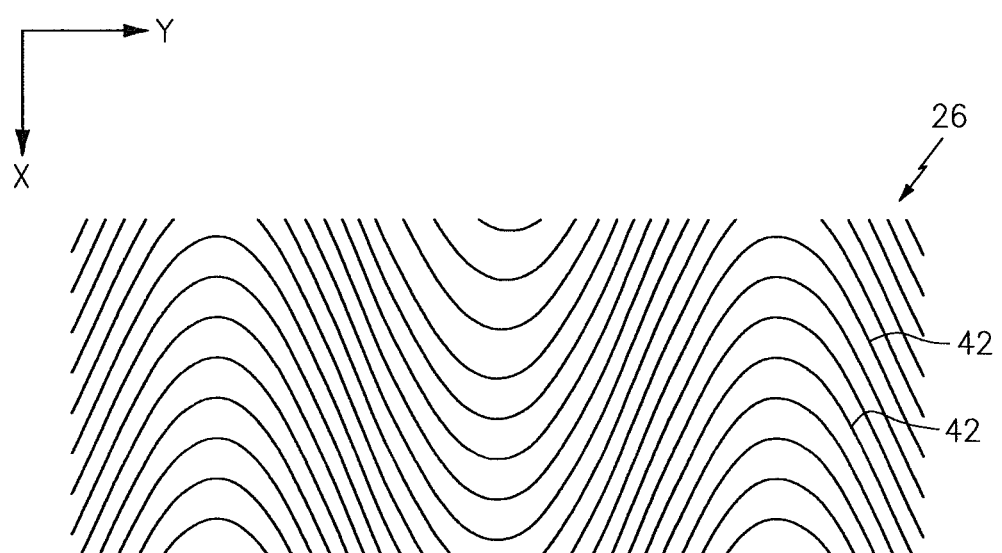
FIG. 8 is a schematic partial illustration of still another structural core.

In some embodiments, referring to FIGS. 7 and 8, the corrugation trajectory 42 of one or more of the corrugations 40 may be non-linear; e.g., zig-zagging. For example, the corrugation trajectory 42 of each corrugation shown in FIG. 7 is a rectilinear zig-zagging trajectory. In another example, the corrugation trajectory 42 of each corrugation shown in FIG. 8 is a curvilinear zig-zagging trajectory; e.g., a sinusoidal trajectory. Of course, in other embodiments, the corrugation trajectory 42 of one or more of the corrugations 40 may be another type of tortuous (e.g., back-and-forth, compound, parabolic, etc.) trajectory.

Figure 9:
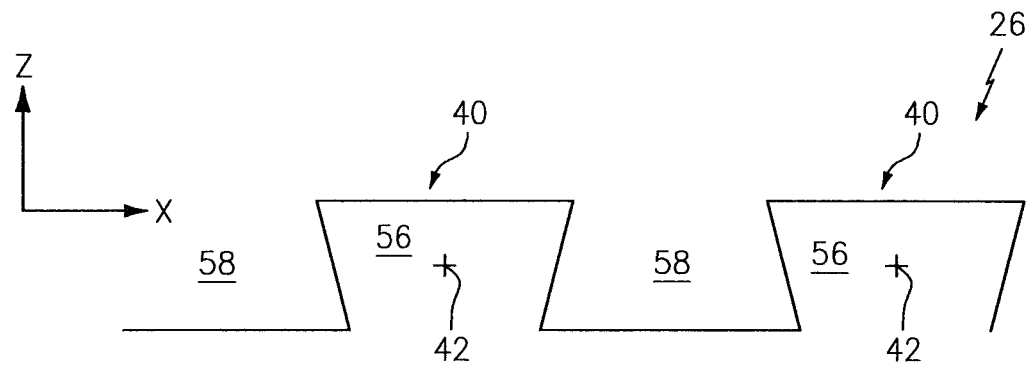
FIG. 9 is a schematic cross-sectional illustration of another structural core.
Figure 10:
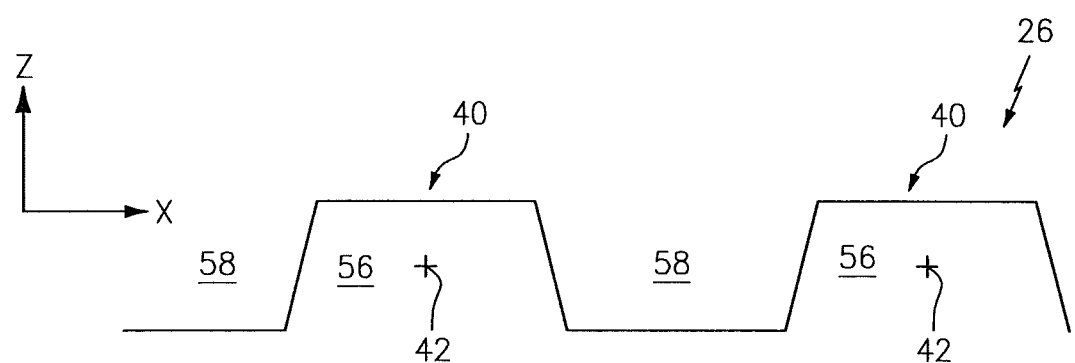
FIG. 10 is a schematic cross-sectional illustration of another structural core.
Figure 11:
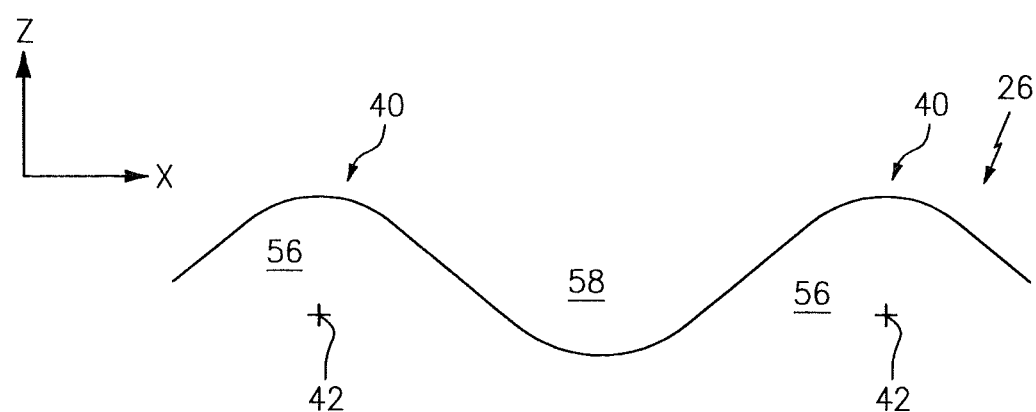
FIG. 11 is a schematic cross-sectional illustration of still another structural core.

In some embodiments, referring to FIGS. 9 to 11, the cross-sectional geometry of one or more of the channels 56, 58 may be non-rectangular. For example, the cross-sectional geometry of each channel 56, 58 shown in FIGS. 9 and 10 are polygonal. In another example, the cross-sectional geometry of each channel 56, 58 shown in FIG. 11 is generally semi-circular. In particular, the corrugated sheet of wire mesh and its corrugations 40 have a sinusoidal cross-sectional geometry in the lateral-vertical (x-z) plane. Still other examples of cross-sectional geometries are shown in FIGS. 16A-16D.

Figure 12:
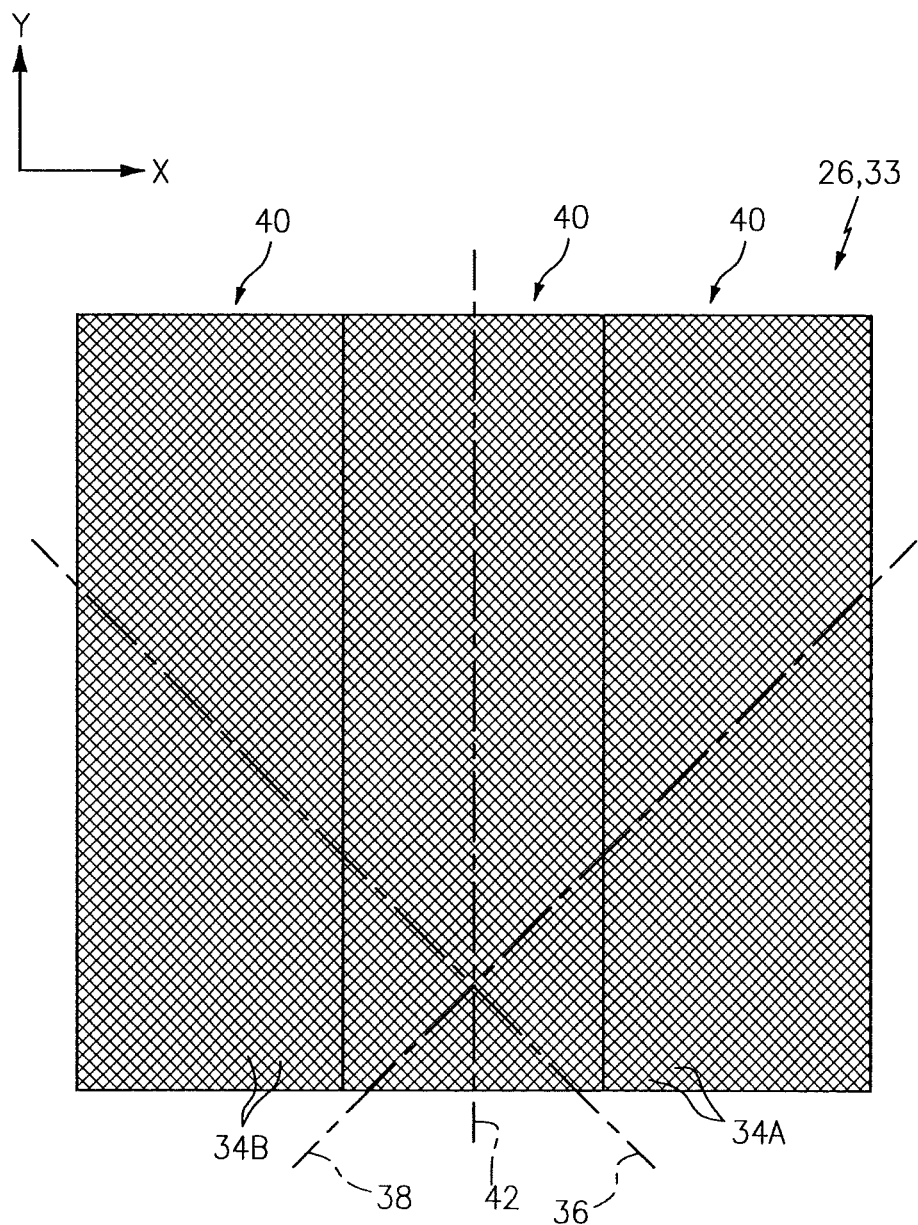
FIG. 12 is a schematic partial illustration of another structural core.

In some embodiments, referring to FIG. 12, the corrugation trajectory 42 of one or more of the corrugations 40 may be angularly offset from the first and/or the second wire trajectories 36 and 38. For example, each corrugation trajectory 42 shown in FIG. 12 is angularly offset from the first and the second wire trajectories 36 and 38 by an acute included angle.

The corrugated geometric structures 33 described above may extend the entirety of the length of the structural panel 20. Alternatively, corrugated geometric structures 33 may extend only a portion of the length of the structural panel 20; e.g., a corrugation may extend a lengthwise distance that is substantially greater than the width of the corrugation, but less than the lengthwise entirety of the structural panel 20.

Figure 13:
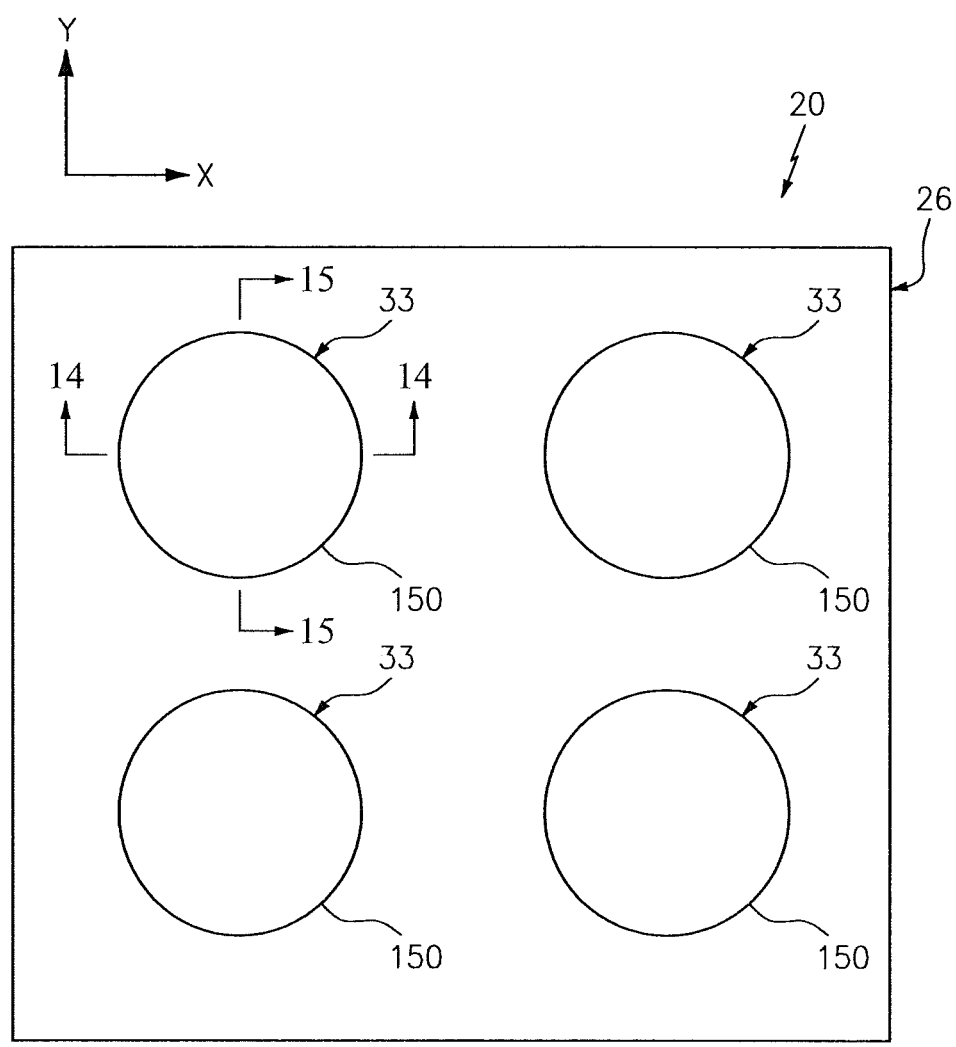
FIG. 13 is a schematic partial, sectional illustration of another structural panel.
Figure 14:
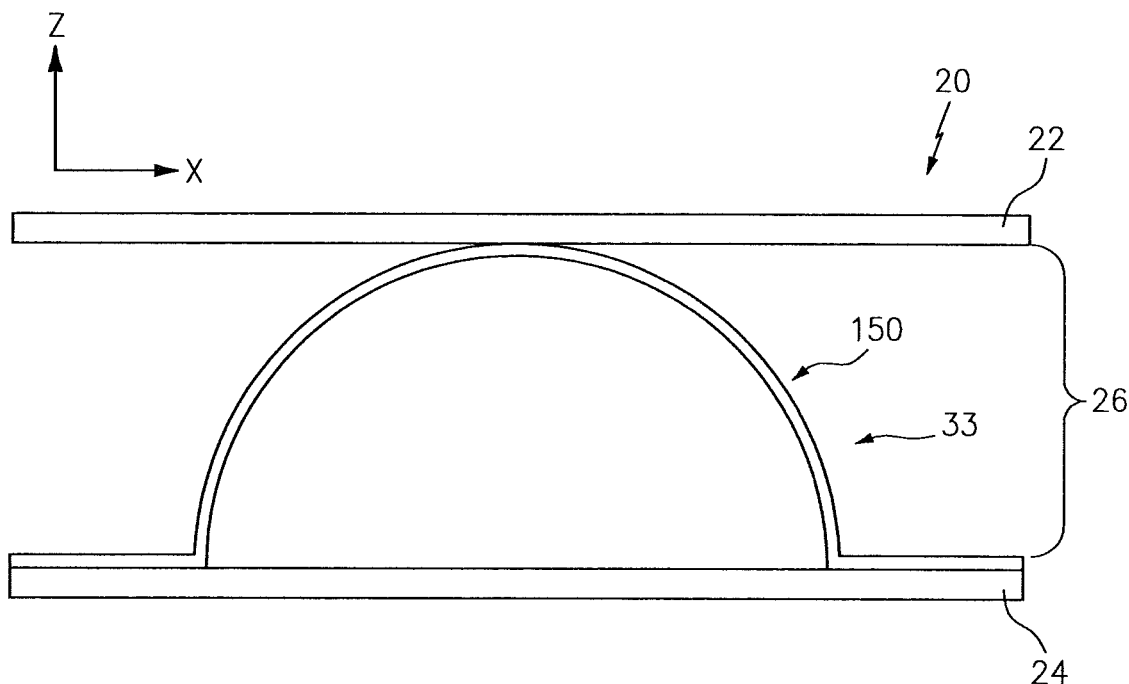
FIG. 14 is a schematic partial, cross-sectional illustration of the structural panel of FIG. 13.
Figure 15:
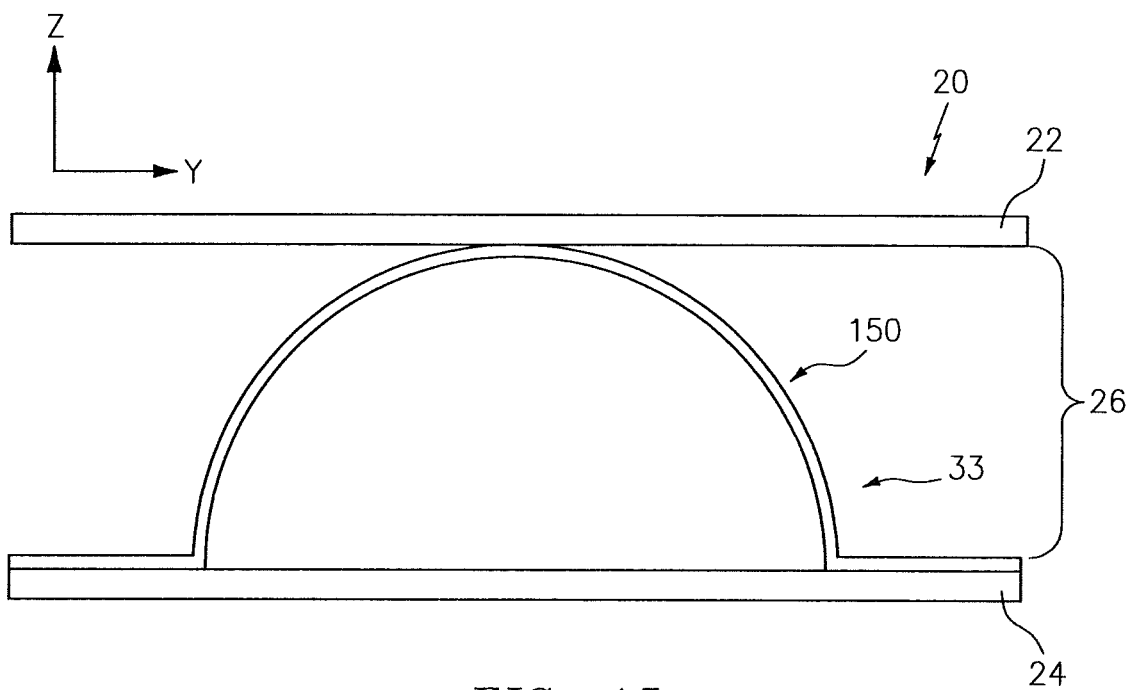
FIG. 15 is a schematic partial, cross-sectional illustration of the structural panel of FIG. 13.
Figure 16A:
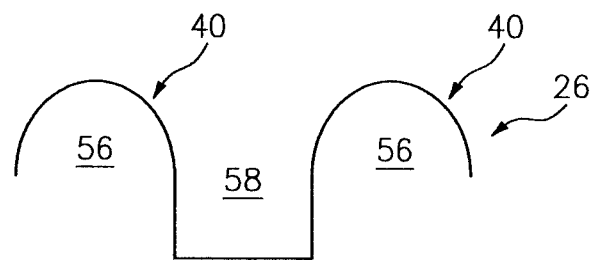
FIGS. 16A-16D are schematic cross-sectional illustrations other structural cores.
Figure 16B:
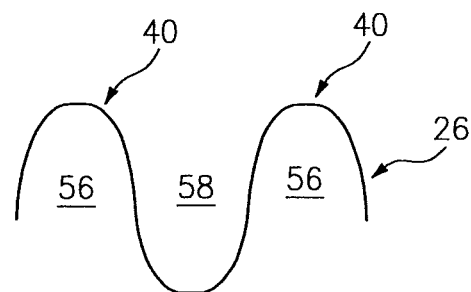
Figure 16C:
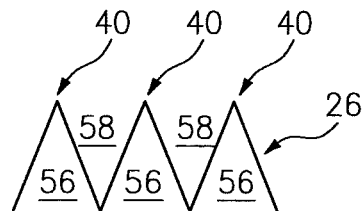
Figure 16D:
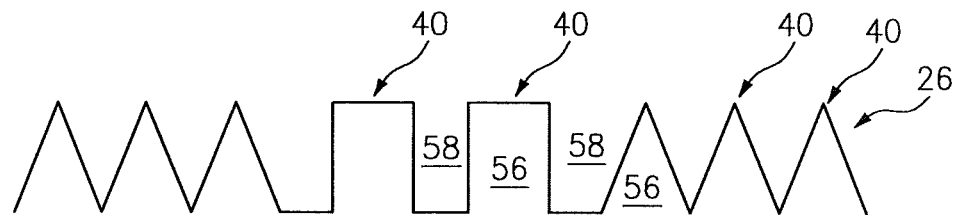
Figure 17A:
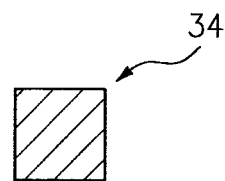
FIGS. 17A-17D are schematic cross-sectional illustrations of exemplary solid wire cross-sections.
Figure 17B:
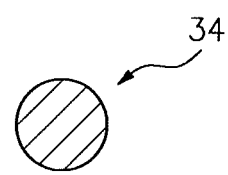
Figure 17C:
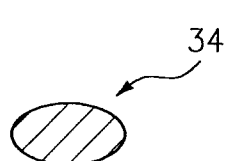
Figure 17D:
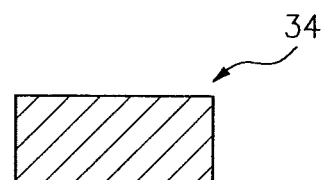

The present structural core 26 is not, however, limited to a structural panel 20 having corrugated geometric structures 33. Another example of an acceptable geometric structure 33 is a "locally enclosed" geometric structure 33. FIG. 13, for example, shows a plurality of locally enclosed geometric structures 33. The term "locally enclosed" as used herein refers to a structure 33 having a least one side wall (e.g., side walls 150) that extends between the first and second skins 22, and which is attached to the skins 22, 24. The side walls 150 and at least one of the skins 22, 24 define a region enclosed by a locally enclosed geometric structure 33, which region has a width distance and a length distance that are relatively close in magnitude (e.g., each is no more than twice the other). "Locally enclosed" geometric structures 33 do not, therefore, extend substantial widthwise or lengthwise distances, therefore, relative to the overall width and/or length of the structural panel 20. For example, FIGS. 13-15 show locally enclosed geometric structures 33 configured as a parti-spherical (e.g., hemi-spherical) dimple. The dimple shaped geometric structure 33 has one or more side walls 150 that collectively form the parti-spherical shape. Alternative shaped locally enclosed geometric structures 33 may assume a variety of different shapes (e.g., a partial egg shape, an egg case shape, a truncated cone, polygonal, etc.) and are not therefore limited to any particular shape.

Figure 18A:
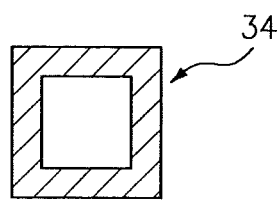
FIGS. 18A and 18B are schematic cross-sectional illustrations of exemplary wire cross-sections with either a hollow core or a core-and-shell construction.
Figure 18B:
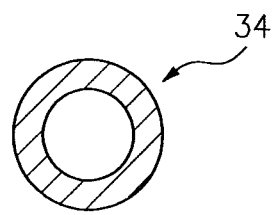

In some embodiments, at least one of the plurality of wires 34 that are used within the structural core 26 may have a different cross-sectional shape and/or size (e.g., gauge) than one or more of the other wires 34 within the structural core 26. For example, the first wires 34A may have a larger gauge than the second wires 34B. In another example, some of the first wires 34A may have a larger gauge than others of the first wires 34A. Similarly, some of the second wires 34B may have a larger gauge than others of the second wires 34B. Furthermore, in some embodiments, the woven sheet of wires 34 may include one or more additional sets of wires extending along other trajectories depending upon the weave pattern. Examples of suitable cross-sectional wire 34 shapes include, but are not limited to, those shown in FIGS. 17A-D, 18A and 18B. In some embodiments, one or more of the wires 34 may be solid as shown in FIGS. 17A-17D. In some embodiments, one or more of the wires 34 may be tubular as shown in FIGS. 18A and 18B with either a hollow core a core-and-shell construction using different materials for the core and the shell respectively.

In some embodiments, the first skin 22 and/or the second skin 24 may be perforated. For example, the first skin 22 may be perforated to add a sound muffling/attenuating functionality to the structural panel 20.

The core 26 may be formed from various materials, particularly metals. Examples of metals from which the wires 34 (e.g., elongated elements) may be formed include, but are not limited to, nickel (Ni) alloy, titanium (Ti) alloy, aluminum (Al), aluminum alloy and stainless steel. In some embodiments, all of the wires 34 (e.g., elongated elements) may be formed from a common material. However, in other embodiments, some of the wires 34 (e.g., elongated elements) may be formed from a first material and others of the wires 34 (e.g., elongated elements) may be formed from a second material different from the first material. Similarly, the entire structural panel 20 may be formed from a common material, or one or more of the panel components 22, 24 and/or 26 may be formed from different materials than the others.

In some embodiments, the structure 33 may be formed (e.g., bent, pressed, folded, etc.) from a 2D woven sheet of wire mesh. In other embodiments, the structure 33 may be formed from a 3D woven sheet of wire mesh.

The structural panel 20 may be included in various turbine engines other than the ones set forth above as well as in other types of rotational and non-rotational equipment. The structural panel 20, for example, may be included in a geared turbine engine where a gear train connects one or more shafts to one or more rotors in a fan section, a compressor section and/or any other engine section. Alternatively, the structural panel 20 may be included in a turbine engine configured without a gear train. The structural panel 20 may be included in a geared or non-geared turbine engine configured with a single spool, with two spools, or with more than two spools. The turbine engine may be configured as a turbofan engine, a turbojet engine, a propfan engine, a pusher fan engine or any other type of turbine engine. The structural panel 20 therefore is not limited to any particular applications.

The present structural panel 20 is described above as having a first skin 22, a second skin 24, and a structural core 26. In some embodiments, the present structural panel 20 may include one or more additional structural cores, and one or more additional skins; e.g., a third skin and a second structural core disposed between the second skin and the third skin. In such embodiments, the additional structural core may be the same as or different from the first structural core, and the third skin may be the same as or different from the first or second skin 22, 24.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An aircraft propulsion system, comprising:
a gas turbine engine;
a nacelle; and
a structural panel comprising a first skin, a second skin and a core;
the first skin having a first side surface, a second side surface, and a thickness extending there between;
the second skin having a first side surface, a second side surface, and a thickness extending there between; and
the core extending between the first side surface of the first skin and the first side surface of the second skin, which core includes a plurality of geometric structures formed of a wire mesh, which geometric structures extend between and are attached to the first skin and the second skin;
wherein the structural panel is included in the gas turbine engine or the nacelle.

2. The aircraft propulsion system of claim 1, wherein the plurality of geometric structures include a plurality of corrugations.

3. The aircraft propulsion system of claim 2, wherein each of the corrugations is formed by a first side portion, a second side portion, and an intermediate portion that extends between the first side portion and the second side portion.

4. The aircraft propulsion system of claim 2, wherein the corrugations are non-linear.

5. The aircraft propulsion system of claim 2, wherein the panel has a length and the corrugations extend substantially an entirety of the length.

6. The aircraft propulsion system of claim 1, wherein the wire mesh is configured from a plurality of wires woven together.

7. The aircraft propulsion system of claim 1, wherein the wire mesh is formed of a plurality of metal wires, a plurality of polymeric wires, a plurality of ceramic wires, or some combination thereof.

8. The aircraft propulsion system of claim 1, wherein the wire mesh is formed of a plurality of wires of a first gauge, and at least one second wire of a second gauge, which second gauge is different from the first gauge.

9. The aircraft propulsion system of claim 1, wherein the wire mesh is formed of a plurality of wires of a first cross-sectional shape, and at least one second wire of a second cross-sectional shape, which second cross-sectional shape is different from the first cross-sectional shape.

10. The aircraft propulsion system of claim 1, wherein the first skin and the second skin are substantially non-perforated.

11. The aircraft propulsion system of claim 2, wherein the plurality of geometric structures include a plurality of locally enclosed structures.

12. The aircraft propulsion system of claim 1, wherein the plurality of geometric structures include a plurality of locally enclosed structures.

13. The aircraft propulsion system of claim 12, wherein each of the locally enclosed structures is formed by at least one side wall, and wherein the side wall and at least one of the first skin or second skin defines an enclosed region.

14. The aircraft propulsion system of claim 13, wherein the locally enclosed structures all have the same shape.

15. The aircraft propulsion system of claim 13, wherein the locally enclosed structures include at least one first type having a first geometric shape, and at least one second type having a second geometric shape, which first geometric shape is different from the second geometric shape.

16. An aircraft propulsion system, comprising:
a gas turbine engine;
a nacelle; and
a structural panel comprising a first skin, a second skin and a core;
the first skin having a first side surface, a second side surface, and a thickness extending there between;
the second skin having a first side surface, a second side surface, and a thickness extending there between; and
the core extending between the first side surface of the first skin and the first side surface of the second skin, wherein at least a first portion of the core is attached to the first skin and at least a second portion of the core is attached to the second skin;
wherein the core includes a plurality of wire elements, which wire elements are configured to permit relative movement there between in a manner that at least partially dissipates intermittent excitation forces applied to the structural panels; and
wherein the structural panel is included in the gas turbine engine or the nacelle.

17. The aircraft propulsion system of claim 16, wherein the plurality of wire elements include metal wires, polymeric wires, or ceramic wires, or some combination thereof.

18. The aircraft propulsion system of claim 16, wherein the plurality of wires includes wires of a first gauge and wires of a second gauge, which second gauge is different from the first gauge.

19. The aircraft propulsion system of claim 1, wherein the structural panel is included in the gas turbine engine.

20. The aircraft propulsion system of claim 1, wherein the wire mesh comprises a plurality of polymeric wires and/or a plurality of ceramic wires.

* * * * *